July 2, 1963 M. E. HARDY 3,096,093

RECORD PLAYERS

Filed Nov. 7, 1956 3 Sheets-Sheet 1

INVENTOR.

Maurice E. Hardy

BY John J. Pedersen

Attorney

INVENTOR.
Maurice E. Hardy
BY John J. Pedersen
Attorney

July 2, 1963 M. E. HARDY 3,096,093
RECORD PLAYERS
Filed Nov. 7, 1956 3 Sheets-Sheet 3
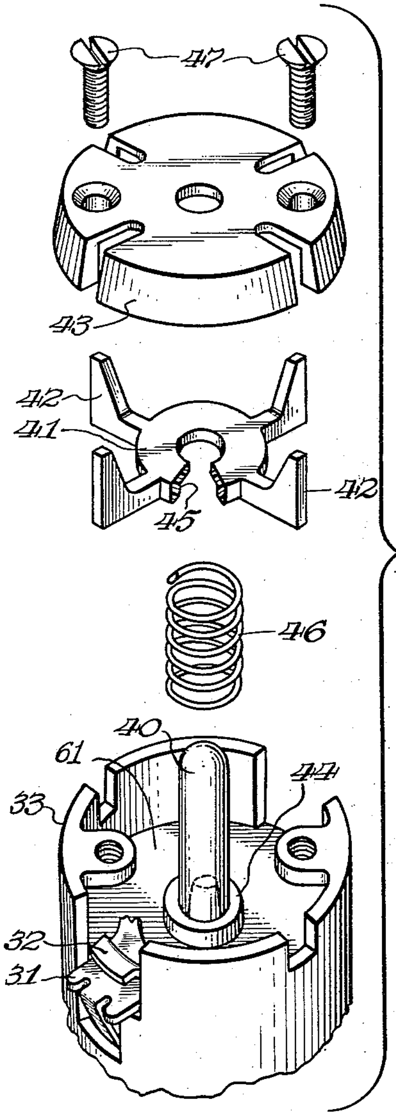
Fig. 3
Fig. 4a
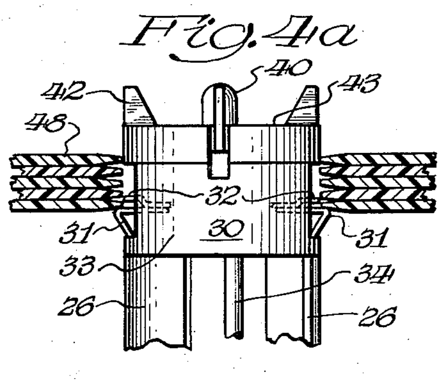
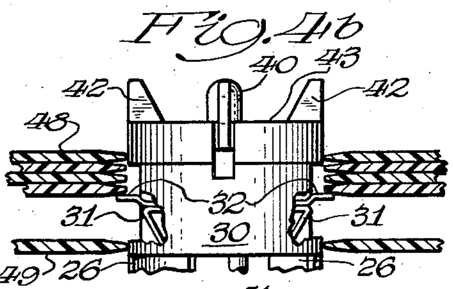
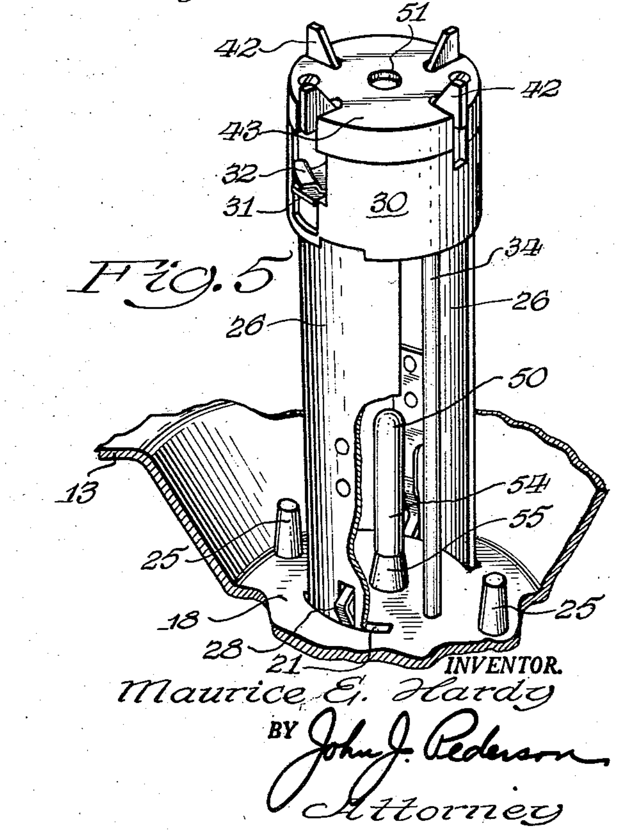
INVENTOR.
Maurice E. Hardy
BY John J. Pederson
Attorney

United States Patent Office 3,096,093

Patented July 2, 1963

3,096,093

RECORD PLAYERS

Maurice E. Hardy, Chicago, Ill., assignor to Zenith Radio Corporation, a corporation of Delaware Filed Nov. 7, 1956, Ser. No. 620,925

8 Claims. (Cl. 274—10)

This invention relates to automatic record players in general and in particular to a record player incorporating novel record indexing and dispensing apparatus.

The evolution of the record disc art to its present day status is well known. From a conventional spindled 78 r.p.m. disc the art has progressed until today four speeds (78, 45, 33⅓ and 16 r.p.m.) are attributed recognition. This course of events has been paralleled by corresponding strides in the record player art. The problem of multiple record disc speeds has been aggravated by a deviation from the standard indexing aperture in the case of the 45 r.p.m. disc, the latter embodying an enlarged indexing aperture (approximately 1½") which of course contributes another parameter to record player design considerations. In order to obviate possible confusion in this specification, the conventional small apertured disc is designated "first type," where convenient, while "second type" record disc has reference to the enlarged aperture 45 r.p.m. disc.

Since the advent of multiple speed record players, the industry has constantly sought to produce an automatic record player capable of reproducing recordings from any of the several type discs at will. A multitude of devices have appeared ranging from simple manually operated players to sophisticated machines capable of playing an intermixture of various sized and apertured discs at their respective speeds.

An established means for enabling automatic record players to accommodate and dispense enlarged-aperture 45 r.p.m. discs makes use of an adapter which slips over the conventional center-drop spindle and is actuated thereby. However, the problems attendant upon usage of a detachable adapter, e.g., mounting, dismounting, displacement, etc. are well known and appreciated. A copending application Serial No. 503,460, filed April 25, 1955, and now Patent 2,918,289 in the name of Maurice E. Hardy, and assigned to the present assignee, describes an automatic record player featuring a retractable 45 r.p.m. record indexing and dispensing assembly to avoid the aforementioned problems attendant upon usage of detachable adapters.

In recent years, a trend indicative of the public's reaction to the use of removable adapters in multiple speed phonographs has been in evidence. Many have determined that the 45 r.p.m. disc more readily lends itself to automatic changing operation while the long playing small apertured 33⅓ r.p.m. recordings provide such extended entertainment as not to require automatic changing apparatus. It might be added that this view is further enhanced by an apprehension on the part of a large segment of the public to subject their expensive long playing records to the wear imposed by automatic changing apparatus tending to adversely affect the life of such recordings. This segment, though conceding the advantages of automatic record playing machinery, decidedly prefers to confine automatic operation to 45 r.p.m. discs while resorting to manual control for 33⅓ r.p.m. discs. The objective can be attained of course with presently available equipment by bypassing the automatic changing feature when reproducing 33⅓ r.p.m. recordings. The prospective user is thus presented with either of two unsatisfactory alternatives; he pays for a feature he does not desire, or he can acquire separate machines.

It is therefore an object of this invention to provide a compact automatic record player embodying a novel record indexing and dispensing mechanism.

It is also an object of this invention to provide an automatic record player amenable to economic production techniques.

It is an object of this invention to provide an automatic record player capable of indexing and automatically dispensing recrod discs characterized by an enlarged central aperture, or alternatively indexing small-aperture discs for manual playing.

A record player constructed in accordance with the invention comprises a motor-driven turntable having a principal level area for supporting both large index-hole and small index-hole disc records. The turntable includes an intermediate surface area which is depressed substantially below the principal level area and serves as a reception space. An adaptor, which supports a quantity of large index-hole disc records, is itself supported at an elevated level above the turntable by a mechanism which also allows the adaptor to be manually submerged to a position where it is substantially completely encompassed by the reception space. A record dispensing apparatus including peripheral support shoulders and associated separator plates is carried by the adaptor and moved therewith between the elevated position and the receptive space position. Finally, means including a spindle, are provided for indexing the small index-hole record discs when the adaptor is manually submerged.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 3 is an exploded view of a portion of the record player of FIGURES 1 and 2;

FIGURES 4*a* and 4*b* are elevation views of the 45 r.p.m. record changing and indexing mechanisms in operation; and FIGURE 5 is a fragmentary perspective view, with portions broken away, showing an alternative embodiment of the invention.

Figure 1:
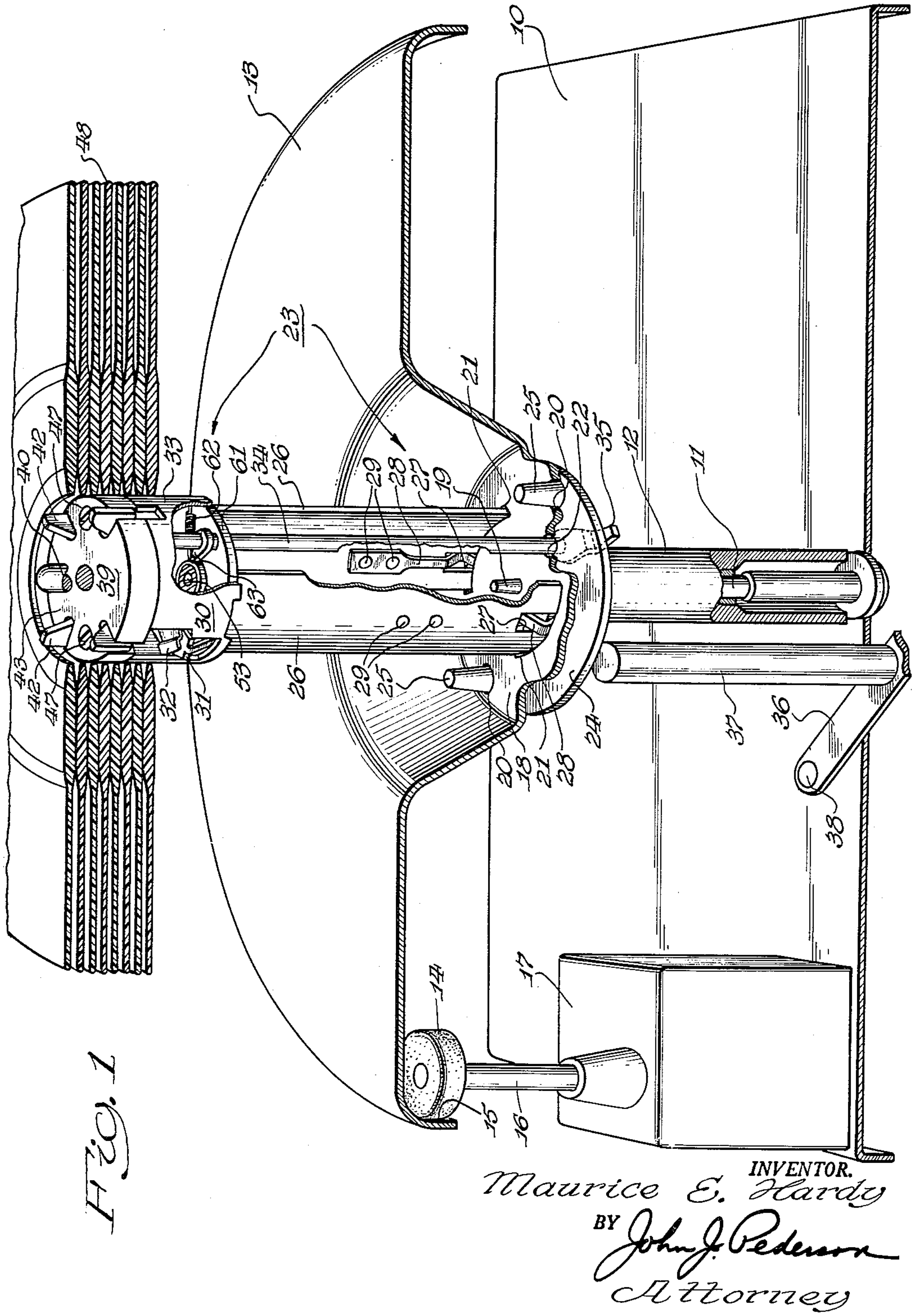
FIGURE 1 is a fragmentary perspective view, partly in section, of a record player constructed in accordance with the invention when adjusted for automatic playing of 45 r.p.m. records.

FIGURE 1 shows a record player embodying the invention and comprising a base plate 10 carrying an upright spindle member 11 received by a bearing member 12 which in turn supports a rotatable turntable 13 and is rigidly affixed thereto. Turntable 13 can be rotatably impelled by a drive wheel 14, frictionally engaged with a dependent inner surface 15 of a skirt flange formed on turntable 13 and conventionally driven through a coupling shaft 16 in conjunction with a variable speed driver 17. Turntable 13 is provided with a depressed center portion 18 through the center of which passes a protuberance 19 and which is further provided with a pair of substantially diametrically opposed alignment openings 20, a pair of arcuate openings 21, and an auxiliary opening 22.

A record changing and indexing assembly 23 is coaxially disposed with respect to turntable 13 and comprises an apertured base member 24 which slidably encompasses bearing member 12, a pair of alignment projections 25 affixed to base 24 and adapted to engage openings 20, and a pair of arcuate support legs 26 likewise fixed to base 24 and slidably captivated within arcuate openings 21. Support legs 26 incorporate a pair of opposed apertures 27, and a pair of detent spring members 28 are secured to support legs 26 by rivets 29 or other known fastening means. Assembly 23 further comprises a large-aperture record disc dispensing mechanism 30 disposed atop support legs 26 and including a pair of retractable support shoulders 31, see also FIGURES 4*a* and 4*b*, and a pair of extensible separator blades 32, disposed within a hollow cylindrical enclosure 33 of a diameter substantially equal to the indexing aperture of a 45 r.p.m. record disc, operable upon rotation of an offset shaft 34 which is vertically movable within auxiliary opening 22. Confined within cylindrical enclosure 33 and coupled to the upper extremity of shaft 34 are conventional actuating means (not shown) for operating aforementioned shoulders 31 and blades 32. A radially projecting dog 35 is rigidly fitted to the lower extremity of shaft 34. Enclosure 33 is provided with a bottom or floor plate 61. Plate 61 has an integral upstanding flange 44 which receives spindle 40, and the latter is provided with a central opening 53 for receiving the alignment pin 19. A restoring spring 62 which can be anchored to bottom plate 61 has its opposite end secured to a crank 63 fixed to shaft 34.

An arm 36 provided with a fixed vertical extension 37 is pivotally secured to base plate 10 by means of a rivet or other fastener 38. The free end of arm 36 can be coupled to a conventional tone arm operating mechanism (not shown) for initiating a record-changing cycle.

The record player is also provided with secondary indexing means 39 centrally supported atop dispensing mechanism 30 and including a fixed central vertical spindle 40, a depressable spider 41 (not fully visible in FIGURES 1 and 2 but shown and described in detail hereinafter in conjunction with FIGURE 3) comprising a plurality of vertically directed peripherally distributed projections 42, and a support plate 43. Depressable spider 41 and support plate 43 peripherally approximate the diameter of enclosure 33 and coaxially encompass fixed spindle 40 which juts from the bottom plate 61.

Figure 2:
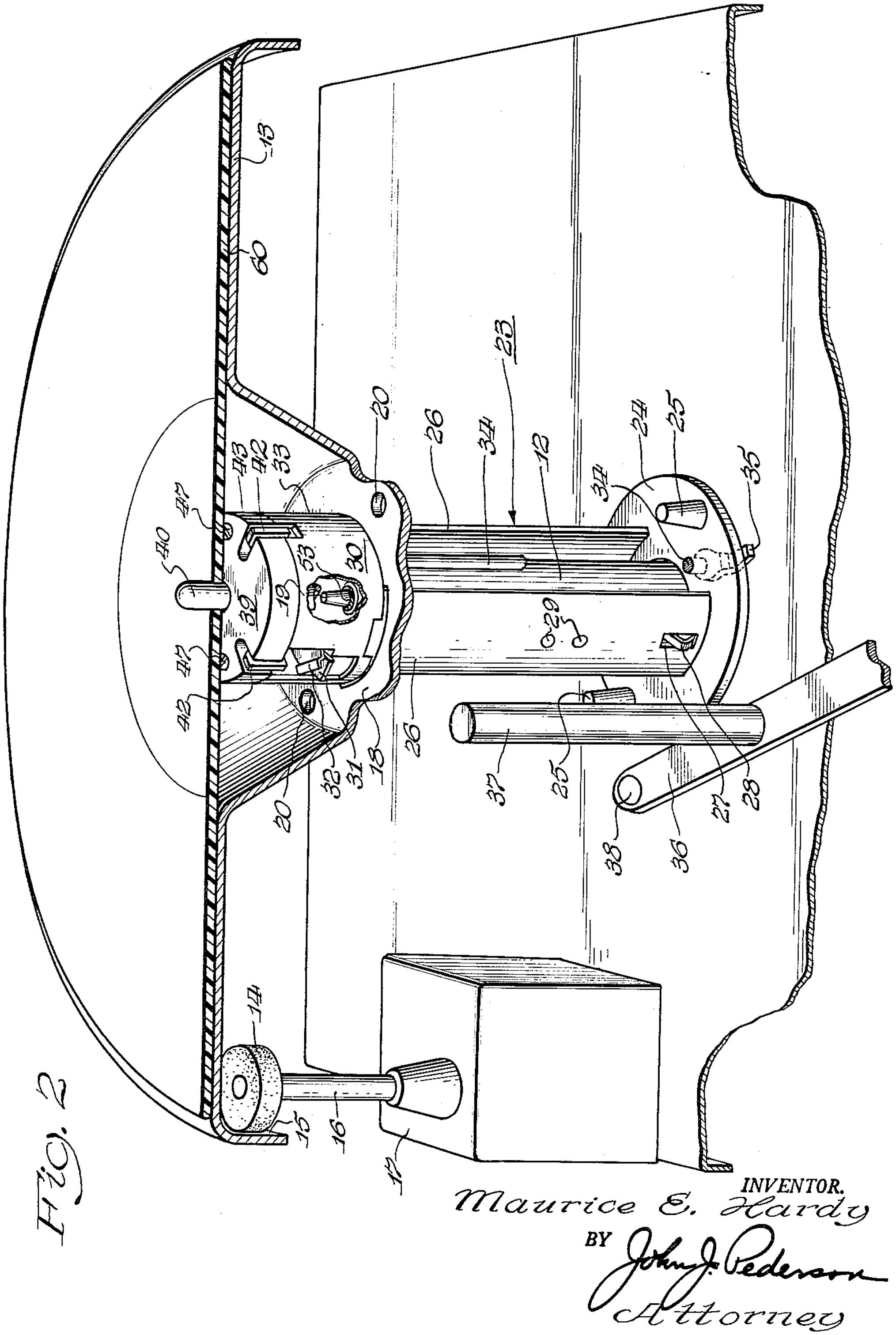
FIGURE 2 is a fragmentary perspective view, partly in section, of the record player of FIGURE 1 adjusted for manual playing of 33⅓ or 78 r.p.m. records.

FIGURE 2 shows the record player with record changing and indexing assembly 23 retracted to an inoperative position below the record supporting surface of the turntable to provide for manual playing of all types of record discs singly. Certain elements of the construction, such as alignment holes 20 and base member 24, are more clearly shown in FIGURE 2.

FIGURE 3 more explicitly details the structural aspects of secondary indexing mechanism 39. Spindle 40 is fixed within an enlarged base flange 44 while depressable spider 41 is provided with a countersink 45 to accommodate flange 44. A spring 46 encompasses fixed spindle 40 and is constrained between base 44 and countersink 45 to yieldably loft spider 41. A pair of fasteners 47 secures support plate 43, depressable spider 41, and spring 46 to enclosure 33.

In the fragmentary elevational views of FIGURES 4*a* and 4*b*, a portion of enclosure 33 is cut away to show more clearly support shoulders 31 and separator blades 32. A stack of second type record discs 48 are displayed in storage while a solitary disc 49 is shown in transit following release.

FIGURE 5 illustrates an alternative centering spindle 50 firmly secured to depressed floor portion 18 and in complementary alignment with an aperture 51 in support plate 43. Spindle 50 may be partially tapered to provide indexing portion 54 of fixed diameter and a conical or tapered alignment portion 55.

Automatic operation with 45 r.p.m. record discs is available when assembly 23 is elevated to that position shown in FIGURE 1. Toward this end, assembly 23 is manually raised with arcuate openings 21 and auxiliary opening 22 guiding support legs 26 and shaft 34, respectively. As assembly 23 nears the terminus of its upward travel projections 25 are channeled into engagement with alignment openings 20; projections 25 are preferably of conical configuration as shown, although mating alignment elements of other configurations may be employed. Detent spring members 28 are first deflected inwardly by arcuate openings 21 and then permitted to spring back as assembly 23 reaches its apex, further vertical movement being prevented by base member 24 encountering depressed portion 18. This detent action releasably locks assembly 23 in its operative or fully elevated position. Automatic operation of record loading can be commenced after seating the stack of discs 48 upon dispensing mechanism 30.

The turntable speed may be appropriately preadjusted by conventional speed selection apparatus (not shown) associated with driver 17. Since the speed selection arrangement forms no part of this invention, block 17 is employed to designate any appropriate mechanism for accomplishing this function. Rotary motion from driver 17 is imparted to shaft 16 and drives wheel 14 which is frictionally engaged with the dependent flange surface 15 of turntable 13. The tone arm mechanism which may also be of conventional construction and is therefore not shown, is coupled to the fore end of arm 36 in such a manner that the inward progression of the tone arm pivotally rotates arm 36 about its pivot 38, counter-clockwise as viewed in FIGURES 1 and 2. As the tone arm or pick-up nears the conclusion of a recording and is accelerated toward the center of the record disc, extension 37 is rapidly directed toward the center of turntable 13. This action places extension 37 in the circumferential path of dog 35 thereby deflecting dog 35 and imparting rotational motion to offset shaft 34. It is to be noted here in passing that shaft 34 is intentionally positioned off center in order to accommodate protuberance 19 whose function will be described below.

Referring now to FIGURES 4*a* and 4*b*, the operational characteristics of dispensing mechanism 30 can be observed. The rotational motion imparted to shaft 34 by the deflection of dog 35 initiates a sequence whereby support shoulders 31 are withdrawn into enclosure 33 and simultaneously separator plates 32 are extended beneath the penultimate disc of stack 48. This action permits the lowermost record 49 alone of stack 48 to descend to turntable 13. The sequence is completed as dog 35 continuing in its circumferential orbit clears extension 37 thus enabling dog 35 and shaft 34 to return to their quiescent positions in response to restoring spring 62. The dispensing cycle of mechanism 30 is then completed with separator plates 32 withdrawing from record stack 48 while support shoulders 31 simultaneously resume support of stack 48. Thus it is seen that dispensing and reproduction of large-aperture record discs is accomplished automatically.

FIGURE 2 shows assembly 23 in the inoperative or retracted position thereby enabling manual operation of either large- or small-aperture record discs. To utilize this manual play feature of the invention, assembly 23 is first returned to the illustrated inoperative position by firmly pressing down upon assembly 23 so as to release detent springs 28 from apertures 27. As assembly 23 approaches its inoperative position, protuberance 19 enters into an internal bore therefor provided in the stem of fixed spindle 40 thereby centering assembly 23 within depression 18 and providing lateral stability to the aforementioned assembly. In this position, it is noted that only projections 42 and spindle 40 extend above the record supporting surface of turntable 13. FIGURE 2 illustrates a small-aperture record disc 60 indexed upon spindle 40 and in operable position for reproduction of its recording. It is noted that projections 42, in this circumstance, are depressed below the upper surface of support plate 43, the weight of disc 60 compressing spring 46. Furthermore, manual play is in no way limited to reproduction of first type record discs. Upon removal of disc 60 a 45 r.p.m.

record disc (not shown) can be indexed about projections 42 of secondary indexing means 39. Thus, auxiliary spindle means 41 provides manual indexing of large-aperture discs and is automatically depressed to provide for manual playing of small-aperture discs; moreover, as best shown in FIGURE 1, projections 42 provide increased storage capacity for large-aperture discs when assembly 23 is extended for automatic operation.

Shaft 34 is offset to permit the installation of an alignment element such as protuberance 19 upon depressed floor portion 18. This protuberance engages the alignment aperture in spindle 40 when assembly 23 is retracted to its inoperative position in the manner hereinbefore described. However, the alternative centering means shown in FIGURE 5 utilizes a spindle 50 whose indexing portion 54 can accommodate first type record discs while its alignment portion 55 is gently sloped in order to provide centering means when urged against alignment aperture 51. Thus when the manual play function is utilized spindle 50, in addition to performing an indexing function for small-aperture record disc, centers and insures lateral stability of assembly 23.

Accordingly, a new and useful concept in the record playing art has been described. The invention permits automatic and manual play of large-aperture record discs and manual play of small-aperture record discs. Further, assembly 23 is retractably mounted to obviate the problems associated with demountable large-aperture record disc adapters. Secondary indexing means 39 in providing a fixed spindle 40 for indexing small-aperture record discs and depressable projections 42 for indexing and/or increased storage of large-aperture record discs and cooperating with the retractable record disc indexing and dispensing assembly 23 presents a novel contribution to the record player art. The component parts of this automatic record player can comprise for the most part inexpensive stampings. The alignment means defined by projections 25, protuberance 19, and spindle 50 in conjunction with their respective receiving apertures provide a degree of secure alignment otherwise obtainable only with precisely machined apparatus.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An automatic record player for playing alternatively record discs of a first type having a small indexing aperture and a second type having a large indexing aperture, comprising: a rotatable turntable having a record supporting surface; a record changing and indexing assembly disposed coaxially with respect to said turntable for indexing record discs of said second type and sequentially feeding said record discs to said turntable, said assembly being manually retractable to an inoperative position below said record supporting surface and manually extendable to an operative position above said turntable; means for releasably locking said assembly in said operative position; and secondary indexing means comprising, a spindle centrally supported atop said assembly for indexing record discs of said first type when said assembly is retracted to said inoperative position, and auxiliary spindle means including a record indexing element, coaxially encompassing said spindle and normally extending above said record-supporting surface but automatically depressable below such surface under the weight of a first type record disc to permit indexing thereof by said spindle, for indexing record discs of said second type when said assembly is retracted to said inoperative position and for augmenting the storage capacity of said assembly for record discs of said second type when said assembly is extended to said operative position.

2. In an automatic record player for alternatively reproducing information from record discs of a first type having a small indexing aperture and from record discs of a second type having a large indexing aperture: the combination of a rotatable turntable having a record supporting level portion and a central depressed level portion, the latter including a plurality of openings; a record changing and indexing assembly disposed coaxially with respect to said turntable for indexing record discs of said second type and sequentially feeding such record discs to said turntable, said assembly being manually retractable to a manual play position, reposing upon said central depressed level portion and manually extendable to a record changing position above said turntable record-supporting level, a plurality of support legs fixed to said record changing and indexing assembly and slidable within said openings of said turntable depressed level portion, means disposed atop said legs for indexing and dispensing record discs of said second type, and secondary indexing means comprising a spindle centrally supported atop said assembly for indexing record discs of said first type and auxiliary spider means, automatically depressable below said record-supporting level under the weight of a first type record disc to permit indexing thereof by said spindle, for indexing record discs of said second type when said assembly is retracted to said inoperative position; alignment means comprising mating alignment elements on said base member and on said turntable for providing rotational stability of said assembly when extended to said operative position; and means for releasably locking said assembly in said operative position.

3. In an automatic record player for alternatively reproducing information from record discs of a first type having a small indexing aperture and from record discs of a second type having a large indexing aperture: the combination of a rotatable turntable member having a record supporting surface and a central depressed surface having a plurality of openings; a record changing and indexing assembly disposed coaxially with respect to said turntable for indexing record discs of said second type and sequentially feeding such record discs to said turntable, said assembly being manually retractable to a low position bottoming on said central depressed surface and manually extendable to a high position above said turntable, a plurality of support legs slidably captivated within said openings of said depressed surface, means disposed atop said legs for indexing and dispensing record discs of said second type, and secondary indexing means comprising a spindle centrally supported atop said assembly for indexing record discs of said first type and auxiliary spider means, automatically depressable below said record-supporting surface under the weight of a first type record disc to permit indexing thereof by said spindle, for indexing record discs of said second type when said assembly is retracted to said inoperative position.

4. In an automatic record player for alternatively reproducing information from record discs of a first type having a small indexing aperture and from record discs of a second type having a large indexing aperture: the combination of a rotatable turntable having a record supporting surface and a central depressd surface having a plurality of openings; a record changing and indexing assembly disposed coaxially with respect to said turntable for indexing record discs of said second type and sequentially feeding such record discs to said turntable, said assembly being manually retractable to a first position reposing on said depressed surface and manually extendable to an operative position above said record-supporting surface, a base member disposed beneath said turntable, a plurality of support legs fixed to said base member and slidable within said depressed surface openings, means disposed atop said legs for indexing and dispensing record discs of said second type, and secondary indexing means comprising a spindle centrally supported atop said assembly for indexing record discs of said first type and auxiliary spider means, automatically depressable below said record-supporting surface under the weight of a first type record disc to permit indexing thereof by said spindle, for indexing record discs of said second type when said assembly is retracted to said inoperative position; means comprising mating alignment elements on said turntable and on said secondary indexing means for accurately locating said assembly with respect to said turntable when retracted to said first position; and means for releasably locking said assembly in said operative position.

5. An automatic disc record feeding record player having a tone arm for tracking the grooves of record discs of a first type having a small indexing aperture and of a second type having a large indexing aperture, which record player comprises: a turntable having a portion for supporting disc records of both said first and second type at a record playing level and a depressed portion at a substantially lower level affording thereby a receptive space between said levels; a record-dispensing magazine apparatus manually shiftable alternatively between an elevated condition at which it is adapted to support a quantity of disc records of said second type and a reposed condition at which it is wholly contained within said receptive space of said turntable; means including a plurality of record support elements borne by said magazine for releasing a lowermost one and for restraining a penultimate one of a stack of disc records of said second type during a record changing cycle; a device moved by the terminal accelerated motion of the record player tone arm upon completion of each play for initiating said record changing cycle; a linkage for transmititng the motion of said device to said record support elements, which linkage is shiftable concurrently with the alternative shiftable conditions of said record dispensing apparatus; and means including a spindle for indexing record discs of said first type when said magazine is shifted to its reposed condition.

6. The combination set forth in claim 5 in which said turntable is a sheet metal member with a centrally depressed portion having a bottom wall section in which is formed an aperture through which said linkage extends.

7. A record player comprising: a motor-driven turntable having a principal level area for supporting both large index-hole and small index-hole disc records, said turntable including an intermediate surface area depressed substantially below said principal level area whereby to provide thereat a reception space; an adaptor for supporting a quantity of large index-hole disc records; a mechanism for supporting said adaptor at an elevated level above said turntable and for allowing said adaptor to be manually submerged from its said elevated level position to one substantially completely encompassed by said receptive space; a record dispensing apparatus including peripheral support shoulders and associated separator plates carried by said adaptor and moved therewith between its elevated level position and its said receptive space position; and means including a spindle for indexing small index-hole record discs when said adaptor is manually submerged.

8. A record player comprising: a motor-driven turntable having a principal level area for supporting both large index-hole and small index-hole disc records, said turntable including an intermediate surface area depressed substantially below said principal level area so as to provide in conjunction with said principal level area a receptive space in said turntable; an adaptor for supporting a quantity of large index-hole disc records; a mechanism for supporting said adaptor at an elevated level above said turntable and for allowing said adaptor to be manually displaced from its said elevated level position to a position within said receptive space; a record dispensing apparatus including peripheral support shoulders and associated separator blades carried by said adaptor and movable therewith between said elevated level position and said receptive space; springable detent means associated with said supporting mechanism for yieldably retaining said adaptor together with its record dispensing apparatus in said elevated level position; and means including a spindle for indexing small index-hole record discs when said adaptor is manually displaced to said receptive space.

References Cited in the file of this patent

UNITED STATES PATENTS

| | | |
|---|---|---|
| 1,568,130 | Blackwell | Jan. 5, 1926 |
| 2,643,127 | Gregg et al. | June 23, 1953 |
| 2,666,648 | Dale | Jan. 19, 1954 |
| 2,693,364 | Chalfin | Nov. 2, 1954 |
| 2,761,686 | Stalling | Sept. 4, 1956 |
| 2,762,627 | Johnson | Sept. 11, 1956 |

FOREIGN PATENTS

| | | |
|---|---|---|
| 680,810 | Great Britain | Oct. 15, 1952 |